United States Patent
Vizzini et al.

(10) Patent No.: US 8,063,159 B2
(45) Date of Patent: Nov. 22, 2011

(54) PROCESS FOR CONTROLLING MORPHOLOGY OF ZIEGLER-NATTA CATALYSTS

(75) Inventors: Kayo Vizzini, Pasadena, TX (US); Henry Enriquez, Pearland, TX (US); Steven D. Gray, Florence, KY (US); Tim J. Coffy, Houston, TX (US); David W. Knoeppel, League City, TX (US)

(73) Assignee: Fina Technology, Inc, Houston, TX (US)

( * ) Notice: Subject to any disclaimer, the term of this patent is extended or adjusted under 35 U.S.C. 154(b) by 958 days.

(21) Appl. No.: 11/778,262

(22) Filed: Jul. 16, 2007

(65) Prior Publication Data

US 2009/0023875 A1    Jan. 22, 2009

(51) Int. Cl.
  *C08F 4/00*    (2006.01)
(52) U.S. Cl. .......................................................... 526/90
(58) Field of Classification Search .................. 526/190, 526/90
  See application file for complete search history.

(56) References Cited

U.S. PATENT DOCUMENTS

2005/0085601 A1* 4/2005 Vizzini et al. .............. 526/124.3

FOREIGN PATENT DOCUMENTS

WO    WO2005/032714    4/2005

* cited by examiner

*Primary Examiner* — David W Wu
*Assistant Examiner* — Sonya Wright

(57) ABSTRACT

Disclosed is a process for making a Ziegler-Natta catalyst having controlled particle size and distribution. It comprises altering the precipitation of a catalyst component from a catalyst synthesis solution including a soluble magnesium containing catalyst precursor by controlling the concentration of either the soluble magnesium containing catalyst precursor, wherein the average particle size of the catalyst component is increased, and the particle size distribution increased, with a decreased concentration of the soluble magnesium containing catalyst precursor; or of the precipitating agent, wherein the average particle size of the catalyst component is increased, and the particle size distribution increased with an increased concentration of the precipitating agent. Use of the invention enables improved catalyst consistency regardless of production scale and customizing of catalyst morphology to desired polymer morphology. The novel catalyst components may be used to prepare polymers, and end-use articles therefrom, having desirable properties.

13 Claims, 1 Drawing Sheet

PROCESS FOR CONTROLLING MORPHOLOGY OF ZIEGLER-NATTA CATALYSTS

BACKGROUND OF THE INVENTION

1. Technical Field

This invention relates to polymers. More particularly, it relates to processes for the preparation of Ziegler-Natta catalysts useful for preparing polymers.

2. Background of the Art

Olefins, also called alkenes, are unsaturated hydrocarbons whose molecules contain one or more pairs of carbon atoms linked together by a double bond. When subjected to a polymerization process, olefins may be converted to polyolefins, such as polyethylene and polypropylene. One commonly used polymerization process involves contacting an olefin monomer with a Ziegler-Natta type catalyst system. Many Ziegler-Natta type polyolefin catalysts, their general methods of making, and subsequent use, are well known in the polymerization art. Typically, these systems may include a Ziegler-Natta type polymerization catalyst component; a cocatalyst; and an electron donor compound. A Ziegler-Natta type polymerization catalyst component may be a complex derived from a halide of a transition metal, for example, titanium, chromium or vanadium, with a metal hydride and/or a metal alkyl that is typically an organo-aluminum compound. The catalyst component is usually comprised of a titanium halide supported on a magnesium compound complexed with an alkylaluminum. There are many issued patents relating to catalysts and catalyst systems designed primarily for the polymerization of propylene and ethylene that are known to those skilled in the art. Examples of such catalyst systems are provided in, for example, U.S. Pat. Nos. 4,107,413; 4,294,721; 4,439,540; 4,114,319; 4,220,554; 4,460,701; 4,562,173; 5,066,738; and 6,174,971, which are fully incorporated herein by reference.

Conventional Ziegler-Natta catalysts comprise a transition metal compound generally represented by the formula $MR_x$, where M is a transition metal compound, R is a halogen or a hydrocarboxyl, and x is the valence of the transition metal. Typically, M is selected from the Group IV to VII metals, such as titanium, chromium or vanadium, and R is chlorine, bromine, or an alkoxy group. Common transition metal compounds may be $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$, and $Ti(OC_{12}H_{25})Cl_3$.

Ziegler-Natta catalysts generally may be provided on a support, e.g., deposited on a solid crystalline support. The support may be an inert solid, which is chemically unreactive with any of the components of the conventional Ziegler-Natta catalyst. The support is often a magnesium compound. Examples of the magnesium compounds which may be used to provide a support source for the catalyst component may be magnesium halides, dialkoxymagnesium, alkoxymagnesium halides, magnesium oxyhalides, dialkylmagnesiums, magnesium oxide, magnesium hydroxide, and carboxylates of magnesium.

The properties of the polymerization catalyst may affect the properties of the polymer formed using the catalyst. For example, polymer morphology typically depends upon catalyst morphology. Good polymer morphology includes uniformity of particle size and shape and an acceptable bulk density. Furthermore, it is desirable to minimize the number of very small polymer particles (i.e., fines) for various reasons, such as for example, to avoid plugging transfer or recycle lines. Very large particles also must be minimized to avoid formation of lumps and strings in the polymerization reactor.

Thus, it would be desirable in the art to improve and/or to control catalyst morphology such as to, by extension, improve polymer morphology.

BRIEF DESCRIPTION OF THE FIGURE

For a detailed understanding of the present invention, reference should be made to the following detailed description of the preferred embodiments, taken in conjunction with the accompanying figure wherein.

SUMMARY OF THE INVENTION

Figure 1:
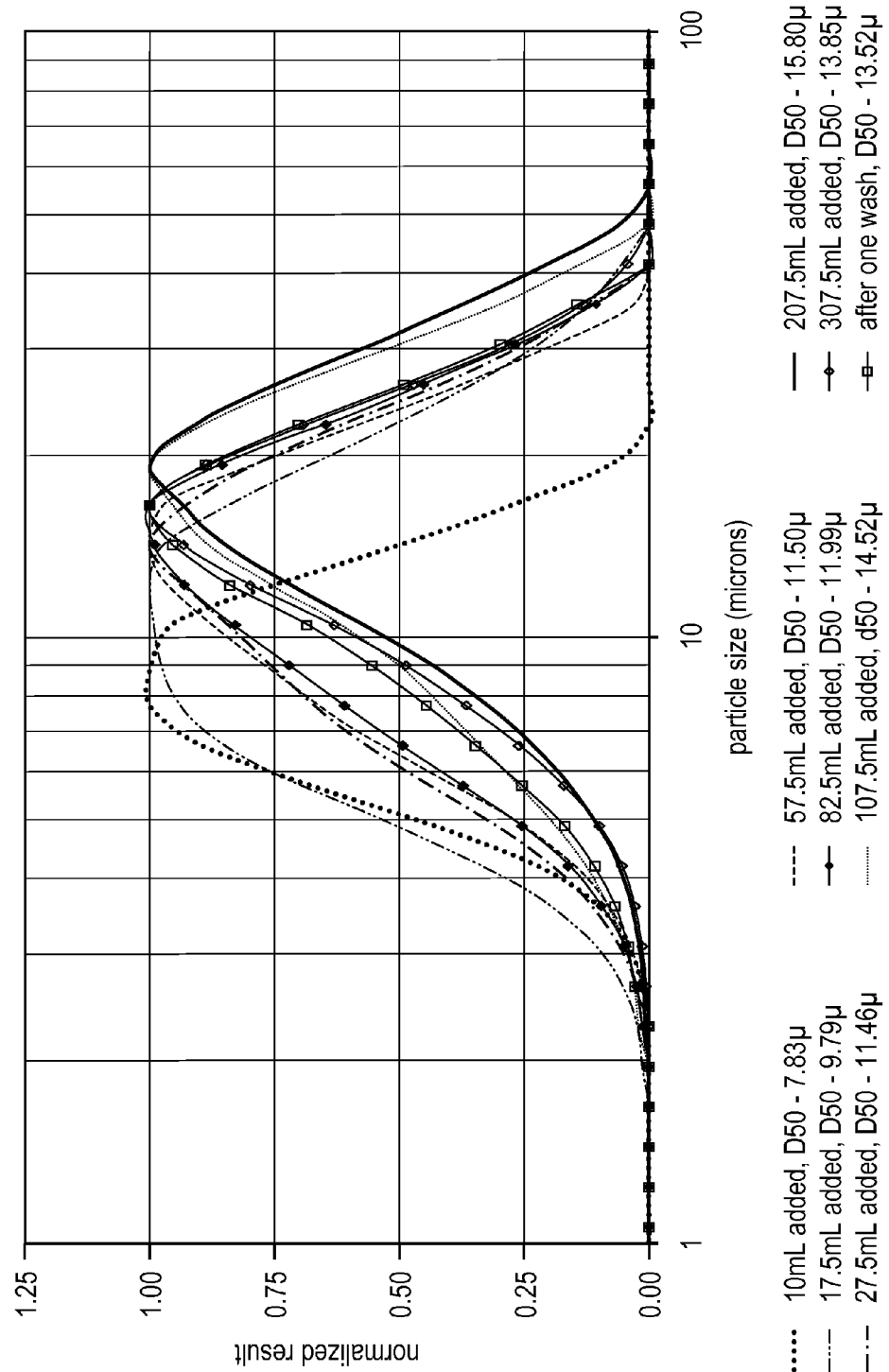
FIG. 1 is a graph illustrating particle size distribution as a function of the point in time during a reaction.

In one aspect, the invention is a process for making a Ziegler-Natta catalyst having controlled particle size and distribution comprising altering the precipitation of a catalyst component from a catalyst synthesis solution including a soluble catalyst precursor and a precipitating agent by controlling the concentration of (1) the soluble catalyst precursor, wherein the average particle size of the catalyst component may be increased, and the particle size distribution increased, with a decreased concentration of soluble catalyst precursor in the catalyst synthesis solution; or (2) the precipitating agent, wherein the average particle size of the catalyst component may be increased, and the particle size distribution may be increased, with an increased concentration of the precipitating agent in the catalyst synthesis solution.

In another aspect the invention is a catalyst component prepared by controlling the concentration of the soluble catalyst precursor, the precipitating agent, or both, as described hereinabove.

In still another aspect the invention is a polymer prepared using the catalyst component of the invention.

In yet another aspect the invention is an end-use article prepared from a polymer prepared using the catalyst component of the invention.

Use of the invention enables improved catalyst consistency regardless of production scale, and also customizing of catalyst morphology to desired polymer morphology, which may also affect the properties of an end-use article prepared from the polymer.

DETAILED DESCRIPTION OF THE INVENTION

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which may be included to enable a person having ordinary skill in the art to make and use the inventions, when the information in this patent is combined with available information and technology.

In one embodiment, the invention involves manipulation of the concentration of the soluble catalyst precursor and/or of the precipitating agent such that a predictable alteration or selection of particle size, and particle size distribution, may be attained during the precipitation of the catalyst component desirably being prepared. In general, it has been found that there may be an inverse relationship between soluble catalyst precursor concentration and catalyst component particle size and particle size distribution, and a direct relationship between precipitating agent concentration and catalyst component particle size and particle size distribution.

The catalyst preparation may be generally described as comprising at least three steps: (1) preparation of a dialkoxide as the reaction product of a metal dialkyl and an alcohol; (2) preparation of a soluble catalyst precursor as the reaction product of the metal dialkoxide and a halogenating/titanating agent; and (3) precipitation of a final solid catalyst component as the reaction product of the soluble catalyst precursor and a precipitating agent. The precipitating agent may in some embodiments also be a halogenating/titanating agent. While additional steps may also be included in practicing the invention, as will be known to those skilled in the art, such as, for example, additional halogenating/titanating steps, the three enumerated steps may be considered to be those conventionally employed, although execution of each step may occur at a different site or manufacturing facility.

The metal dialkyls may include Group IIA metal dialkyls. The metal dialkyl may be, for example, a magnesium dialkyl. Suitable and non-limiting examples include diethyl magnesium, dipropyl magnesium, dibutyl magnesium, butylethyl magnesium (BEM), and the like. In one embodiment butylethyl magnesium may be employed.

The alcohol may be, in one embodiment, any compound conforming to the formula $R^1OH$ and yielding the desired metal dialkoxide upon reaction as described hereinabove may be utilized. In the given formula $R^1$ may be an alkyl group of 2 to 20 carbon atoms. Non-limiting examples of suitable alcohols include ethanol, propanol, isopropanol, butanol, isobutanol, 2-methyl-pentanol, 2-ethylhexanol, and the like. While it is believed that almost any alcohol may be utilized, whether linear or branched, a higher order branched alcohol, for example, 2-ethyl-1-hexanol (also called 2-ethylhexanol), may be utilized in particular embodiments.

The amount of alcohol relative to the metal dialkyl may vary over a wide range, provided that the result is the desired metal alkoxide. For example, a level of from about 0.01 to about 10 equivalents of alcohol relative to the metal dialkyl may be employed. In some embodiments a level ranging from about 0.5 to about 6 equivalents may be used, and in other embodiments a level ranging from about 1 to about 3 equivalents may be selected.

A problem that may be encountered when a selected metal dialkyl is added to a solution may be a dramatic increase in the solution's viscosity. This undesirably high viscosity may be reduced by adding to the solution an aluminum alkyl, such as, for example, triethyl aluminum (TEAl), which operates to disrupt the association between the individual alkyl metal molecules. In some embodiments it may be therefore desirable to include the alkyl aluminum, in an alkyl aluminum-to-metal ratio of from 0.001:1 to 1:1. In other embodiments the ratio may be from 0.01:1 to 0.5:1; and in still other embodiments the ratio may be from 0.03:1 to 0.2:1. In addition, an electron donor such as an ether, for example, diisoamyl ether (DIAE), may be used to further reduce the viscosity of the alkyl metal. The typical ratio of electron donor to metal ranges from 0:1 to 10:1 and may range from 0.1:1 to 1:1.

In the practice of the invention, the metal dialkoxide produced by the reaction of dialkyl metal and alcohol may be a magnesium compound of the general formula $Mg(OR^2)_2$ wherein $R^2$ may be a hydrocarbyl or substituted hydrocarbyl of 1 to 20 atoms. In one embodiment, the metal dialkoxide may be non-reducing. Non-limiting examples of species of metal dialkoxides which may be used include magnesium di(2-ethylhexoxide) and other Group IIA metal dialkoxides, may be produced by reacting an alkyl magnesium compound ($MgR^3R^4$, i.e., a metal dialkyl wherein $R^3$ and $R^4$ may be each independently any alkyl group of 1 to 10 carbon atoms) with an alcohol ($R^1OH$) and an aluminum alkyl ($AlR^5_3$) wherein $R^5$ may be any alkyl group of 1 to 10 carbon atoms. Suitable magnesium dialkyl compounds include, for example, diethyl magnesium, dipropyl magnesium, dibutyl magnesium, and butylethyl magnesium (BEM). The $MgR^3R^4$ compound may be BEM, wherein the reaction products, in addition to the magnesium dialkoxide, may be denoted as $R^3H$ and $R^4H$ and may be butane and ethane, respectively.

In the second step of the generalized reaction scheme, the metal dialkoxide may be reacted with a halogenating agent to form a soluble catalyst precursor. This step may be accomplished in one or several parts. In this case a compound conforming to the formula $ClAR^6_x$ may in some embodiments be selected as the halogenating agent. In the formula A may be a nonreducing oxyphilic compound which may be capable of exchanging one chloride for an alkoxide, $R^6$ may be a hydrocarbyl or substituted hydrocarbyl, and x may be the valence of A minus 1. Examples of A include titanium, silicon, aluminum, carbon, tin and germanium, and in some embodiments titanium or silicon wherein x may be 3. Where titanium is included, the agent may be referred to as a halogenating/titanating agent. Examples of $R^6$ include methyl, ethyl, propyl, isopropyl and the like having from 2 to 6 carbon atoms. A non-limiting example of a halogenating/titanating agent that may be used may be $ClTi(OiPr)_3$ and, as a halogenating agent, $ClSi(Me)_3$, wherein Me is methyl and iPr is isopropyl.

The halogenation may be generally conducted in a hydrocarbon solvent under an inert atmosphere. Non-limiting examples of suitable solvents include toluene, heptane, hexane, octane and the like. In this halogenating step, the mole ratio of metal alkoxide to halogenating agent is, in some embodiments, in the range of about 6:1 to about 1:3, and in other embodiments from about 3:1 to 1:2, and in still other embodiments from about 2:1 to 1:2, and in yet other embodiments may be about 1:1.

Halogenation may be carried out at a temperature from about 0° C. to about 100° C. and for a reaction time in the range of from about 0.5 to about 24 hours. In other embodiments a temperature of from about 20° C. to about 90° C. may be used, and the reaction time may range from about 1 hour to about 4 hours.

The halogenation, in this case, chlorination, that takes place results in a reaction product which is the soluble catalyst precursor, which may in some embodiments be of uncertain composition. Such product is, in some embodiments, a partially halogenated metal compound, which may conform to the formula $XMg(OR^1)$, wherein X may be a halogen and $R^1$ may be an alkyl group of 2 to 20 carbon atoms as already defined. For example, the product may be an adduct, which is defined herein as representing an association complex. One such adduct or complex could be, for example, $Mg(O-2-EtHex)_2 \cdot ClTi(O^iPr)_3$, wherein EtHex is ethylhexoxide. Any compound having the general formula $ClTi(OR^a)_3$ wherein $R^a$ is a linear or branched $C_4$ to $C_{20}$ alkyl or alkyl moiety may also be used with the present invention as this product. Regardless of the constituents or the nature of their association, the soluble catalyst precursor may be substantially soluble, which is defined herein as having a solubility of at least about 90 percent by weight, and in desirable embodiments more than about 95 percent by weight, in the catalyst synthesis solution.

Following formation of the soluble catalyst precursor, a halogenating-titanating agent may be used for the purpose of precipitating the desired final solid catalyst component. Thus, this agent is herein referred to as the "precipitating agent" in order to more clearly separate it, by virtue of its effect, from other halogenating agents, some of which may contain titanium and therefore double as titanating agents, that may be used in forming the soluble catalyst precursor via reaction of that agent with the metal dialkoxide. The precipitating agent may be, in some embodiments, blends of two tetra-substituted titanium compounds with all four substituents being the same and the substituents being a halide or, in alternative embodiments, an alkoxide or phenoxide with from 2 to 10 carbon atoms, such as $TiCl_4$ and $Ti(OBu)_4$ wherein Bu is butyl. In other embodiments, the precipitating agent may be a single compound.

If a blend is chosen, a combination of a titanium halide and an organic titanate may, in some embodiments, be selected. For example, a blend of $TiCl_4$ and $Ti(OBu)_4$, may be utilized. In some desirable embodiments a blend of $Ti(OBu)Cl_3$ and $Ti(OBu)_2Cl_2$ may be selected as the precipitating agent. Where a blend of $TiCl_4$ and $Ti(OBu)_4$ is selected, for example, the proportion of the constituents may vary over a range of from 0.5:1 to 6:1, and in some embodiments from about 2:1 to 3:1.

Controlling the precipitation step of the process of the invention; by adjustments to either the concentration of the soluble catalyst precursor or the precipitating agent, or both; provides an effective means of adjusting the morphology of the solid catalyst component that results. It has been found that decreasing the concentration of the soluble catalyst precursor in the catalyst synthesis solution may result in increased average particle size of the resulting catalyst component. Conversely, increasing the concentration of the precipitating agent has essentially the same effect. While the concentration of the soluble catalyst precursor will, obviously and automatically, decrease as more and more is converted to catalyst component via the precipitation reaction, it is this intentional, enhanced reduction in its concentration, by means such as, for example, increasing the amount of a diluent that enables control of the morphology of the catalyst component produced thereby. In addition or alternatively, a similar control effect may be obtained via an intentional increase in the concentration of the precipitating agent, such as by simply adding more precipitating agent.

The amount of precipitating agent utilized may be sufficient to precipitate a solid product from the solution. In general, where it is desired to effect control according to the invention via an increase in the precipitation concentration, the amount of the precipitating agent, based on the ratio of titanium to metal in the magnesium containing component, may be in the range of from about 0.5:1 to about 6:1, typically from about 2:1 to about 5:1, and may be in the range of from about 2.5:1 to about 3.5:1. However, if it is desired to practice the invention without modification of the precipitating agent's concentration but rather by modifying only the concentration of the soluble catalyst precursor, embodiments include employing a precipitating agent concentration of from about 0.5:1 to about 5:1, typically from about 1:1 to about 4:1, and may be in the range of from about 1.5:1 to about 2.5:1. The percent concentration of the precipitating agent may any that are consistent with the ratios above, but in some embodiment, the percent concentration of the precipitating agent is about 12 percent.

As noted hereinabove, the concentration of the soluble catalyst precursor may decrease as the precipitate is formed. Nonetheless, enhancing this reduction in concentration by increasing the amount of diluent in the catalyst synthesis solution also may enable modification of catalyst component morphology.

If it is desired to modify the soluble catalyst precursor concentration, it may be desirable in some embodiments to utilize a starting concentration, i.e., just prior to addition of the precipitating agent, of less than about 40 percent by weight of the soluble catalyst precursor, and in other embodiments less than about 5 by weight. In other embodiments, the starting concentration is less than about 30 percent or less than about 20 percent. In still other embodiments, it is less than about 15 percent.

The overall effect of either of these alterations, decreasing the soluble catalyst precursor concentration or increasing the precipitating agent concentration translates into fewer fines being produced, which may be responsible for improved performance during the polymerization of olefins. Also, the size distribution may be broadened, i.e., the graphed Gaussian distribution shifts overall to the right. The result of this shift may also be improved performance of the catalyst during the polymerization of olefins, such that desirable improvements in polymer morphology may be attained. It also offers improved consistency of the catalyst morphology regardless of the production scale employed to produce it.

In some embodiments the precipitation may be carried out at room temperature. The solid catalyst component may be then recovered by any suitable recovery technique known to those skilled in the art, and then desirably washed at room/ambient temperature with a solvent, such as hexane. Generally, the solid catalyst component may be washed until the [Ti] may be less than about 100 mmol/L. In the invention [Ti] represents any titanium species capable of acting as a second generation Ziegler catalyst, which would comprise titanium species that are not part of the reaction products as described herein. The resulting catalyst component may then, in some embodiments, be subjected to additional halogenation/titanation steps, if desired, to produce alternative and/or additional catalyst products. After each halogenation/titanation step the solid product may be washed until the [Ti] may be less than a desired amount, for example, less than about 100 mmol/L, less than about 50 mmol/L, or less than about 20 mmol/L. Following the final halogenation/titanation step, whether it may be the precipitation step per se or a step subsequent thereto, the product may be washed until the [Ti] may be less than a desired amount, for example, less than about 20 mmol/L, less than about 10 mmol/L, or less than about 1.0 mmol/L. While not wishing to be bound by any theory, it is believed that a lower [Ti] may be instrumental in producing improved catalyst results by reducing the amount of titanium that may act as a second generation Ziegler species. It is believed that a lower [Ti] may be a factor in producing improved catalyst results such as a narrower molecular weight distribution in the polymer.

Where use of halogenation/titanation agents may be desired following the precipitation step, a titanium halide, such as titanium tetrachloride ($TiCl_4$), may be selected. In this case the halogenation/titanation agent may be added to the slurry. While this addition may be often carried out at ambient/room temperature, it may also be carried out at other temperatures and pressures and under a variety of conditions. The amount of such additional agent may be in a titanium to magnesium ratio of from about 0.1 to 5.0 equivalents, in some embodiments desirably about 2.0, and in other embodiments from about 0.25 to about 4, in still other embodiments from about 0.3 to about 3 equivalents, and in still other embodiments from about 0.4 to about 2.0 equivalents. In one desirable embodiment, the amount of the halogenating/titanating agent utilized in post-precipitation steps may be from about 0.45 to about 1.5 equivalents.

Optionally, an electron donor may also be employed, during the halogenation/titanation, to produce the soluble catalyst precursor; during the precipitation, to produce the (solid) catalyst component; or during subsequent halogenations/titanations, to produce alternative catalyst components. Electron donors useful in the preparation of polyolefin catalysts are well known in the art, and any suitable electron donor that will provide a suitable catalyst may be used. Electron donors, also known as Lewis bases, may be typically organic compounds of oxygen, nitrogen, phosphorus, or sulfur which may be capable of donating an electron pair to the catalyst.

Such electron donor may be a monofunctional or polyfunctional compound, and may be selected from among the aliphatic or aromatic carboxylic acids and their alkyl esters, the aliphatic or cyclic ethers, ketones, vinyl esters, acryl derivatives, particularly alkyl acrylates or methacrylates, and silanes. An example of a suitable electron donor may be di-n-butyl phthalate. A generic example of a suitable electron donor may be an alkylsilylalkoxide of the general formula $RSi(OR')_3$, e.g., methylsilyltriethoxide [$MeSi(OEt_3)$], where R and R' may be alkyls with 1-5 carbon atoms and may be the same or different.

An internal electron donor may be used in the synthesis of the catalysts and an external electron donor, or stereoselectivity control agent (SCA), to activate the catalyst at polymerization. An internal electron donor may be used in the formation reaction of the catalyst during the halogenation or halogenation/titanation steps. Compounds suitable as internal electron donors for preparing conventional supported Ziegler-Natta catalyst components include ethers, diethers, ketones, lactones, electron donor compounds with nitrogen, phosphorus and/or sulfur atoms, and specific classes of esters. Particularly suitable may be the esters of phthalic acid, such as diisobutyl, dioctyl, diphenyl and benzylbutylphthalate; esters of malonic acid, such as diisobutyl and diethyl malonate; alkyl and aryl pivalates; alkyl, cycloalkyl and aryl maleates; alkyl and aryl carbonates, such as diisobutyl, ethylphenyl, and diphenyl carbonate; and succinic acid esters, such as mono and diethyl succinate.

External electron donors which may be utilized in the preparation of a catalyst according to the present invention include organosilane compounds such as alkoxysilanes of the general formula $SiR_m(OR')_{4-m}$ wherein R may be selected from the group consisting of alkyl, cycloalkyl, aryl and vinyl groups; R' may be an alkyl group; and m may be 0-3, wherein R may be the same as R'; and further wherein, when m may be 0, 1 or 2, the R' groups may be the same or different; and when m may be 2 or 3, the R groups may be the same or different.

The external electron donor useful in the invention may be selected from a silane compound of the following formula:

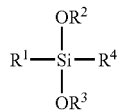

wherein $R^1$ and $R^4$ may be both an alkyl or cycloalkyl group containing a primary, secondary or tertiary carbon atom attached to the silicon, $R^1$ and $R^4$ being the same or different; and $R^2$ and $R^3$ may be alkyl or aryl groups. $R^1$ may be methyl, isopropyl, isopentyl, cyclohexyl, or t-butyl; $R^2$ and $R^3$ may be methyl, ethyl, propyl or butyl groups and are not necessarily the same; and $R^4$ may also be methyl, isopropyl, cyclopentyl, cyclohexyl or t-butyl. Specific external electron donors may be cyclohexyl methyldimethoxy silane (CMDS), diisopropyl dimethoxysilane (DIDS), cyclohexylisopropyl dimethoxysilane (CIDS), dicyclopentyl dimethoxysilane (CPDS) and di-t-butyl dimethoxysilane (DTDS).

The catalyst component made as described hereinabove may be combined with an organometallic catalyst component (a "preactivating agent") to form a preactivated catalyst system suitable for the polymerization of olefins. Typically, the preactivating agents which may be used together with the catalyst component of the invention may be organometallic compounds such as aluminum alkyls, aluminum alkyl hydrides, lithium aluminum alkyls, zinc alkyls, magnesium alkyls and the like. Organoaluminum compounds may be used in some embodiments. Where such is selected it may be an aluminum alkyl of the formula $AlR_3$ wherein at least one R may be an alkyl having 1-8 carbon atoms or a halide, and wherein each R may be the same or different. The organoaluminum preactivating agent may be trialkyl aluminum, such as, for example, trimethyl aluminum (TMA), triethyl aluminum (TEAl) and/or triisobutyl aluminum (TIBAl). The ratio of aluminum to titanium may be desirably in the range from about 0.1:1 to 2:1 and typically may be from 0.25:1 to 1.2:1.

The catalyst component of the invention may be used in any process for the homopolymerization or copolymerization of any type of alpha olefins. For example, the present catalyst may be useful for catalyzing ethylene, propylene, butylenes, pentene, hexane, 4-methylpentene and other alpha alkenes having at least 2 carbon atoms, and also for mixtures thereof. Polymers of the above monomers may exhibit desirable properties such as broader molecular weight distribution and multi-modal distributions such as bimodality and trimodality. The catalyst component of the invention may be utilized for the polymerization of ethylene to produce polyethylene.

Various polymerization processes may be employed with the invention, such as for example, single and/or multiple loop processes, batch processes and continuous processes not involving a loop-type reactor. An example of a multiple loop process than may employ the invention may be a double loop system in which the first loop produces a polymerization reaction in which the resulting polyolefin has a lower molecular weight than the polyolefin produced from the polymerization reaction of the second loop, thereby producing a resultant resin having broader molecular weight distribution and/or bimodal characteristics. In the alternative, another example of a multiple loop process that may employ the present invention may be a double loop system in which the first loop produces a polymerization reaction in which the resulting polyolefin has a greater molecular weight than the polyolefin produced from the polymerization reaction of the second loop, thereby producing a resultant resin having broader molecular weight distribution and/or bimodal characteristics.

The polymerization process may be, for example, bulk, slurry or gas phase. A catalyst component of the invention may be used in slurry phase polymerization. Polymerization conditions (e.g., temperature and pressure) may be dependent upon the type of equipment utilized in the polymerization process, as well as the type of polymerization process utilized, and are known in the art. Generally, the temperature will be in a range of from about 50 to about 110° C., and the pressure in a range of from about 10 to about 800 psi.

The activity of the resulting catalyst of embodiments of the invention may be at least partially dependent upon the polymerization process and conditions, such as, for example, equipment utilized and temperature of reaction. For example, in the embodiment of polymerization of ethylene to produce polyethylene, generally the catalyst component may have an activity of at least 5,000 g PE/g catalyst, but may have an activity of greater than 50,000 g PE/g catalyst, and, in some embodiments, the activity may be greater than 100,000 g PE/g catalyst.

In carrying out a polymerization using the inventive catalyst component, the olefin monomer may be introduced into the polymerization reaction zone in a diluent that may be a nonreactive heat transfer agent that may be a liquid at the reaction conditions. Examples of such a diluent may be hexane and isobutane. For the copolymerization of ethylene with another alpha-olefin, such as, for example, butene or hexene, the second alpha-olefin may be present at a level of from about 0.01 to about 20 mole percent, and in certain desirable embodiments may be from about 0.02 to about 10 mole percent.

Polymers produced using the catalyst component of the invention may have, in some embodiments, a molecular weight distribution (MWD) of at least about 4.5, and in other embodiments at least about 6.0. The polymer may also exhibit improved fluff morphology.

Thus, the polymers may exhibit relatively large particle size and a relatively uniform particle size distribution, wherein so-called fines (particles of diameter less than about 125 microns) may be present in relatively low concentrations, such as, for example, less than about 2 percent by weight and, in some embodiments, less than about 1 percent by weight. Improvements in powder bulk density may also be exhibited. In some embodiments the bulk density value may be greater than about 0.25 g/cc, and in other embodiments greater than about 0.35 g/cc, and in still other embodiments greater than about 0.40 g/cc.

The polyolefins of the present invention may be desirably suitable for use in a variety of applications such as, for example, in extrusion processes, to yield a wide range of products. These extrusion processes include, for example, blown film extrusion, cast film extrusion, slit tape extrusion, blow molding, pipe extrusion, and foam sheet extrusion. These processes may comprise mono-layer extrusion or multi-layer coextrusion. End use applications may include, for example, films, fibers, pipe, textile material, feminine hygiene products, food packaging, grocery sacks, pressure rated pipes and the like.

The following examples are provided to more fully illustrate the invention. As such, they are intended to be merely illustrative and should not be construed as being limitative of the scope of the invention in any way. Those skilled in the art will appreciate that modifications may be made to the invention as described without altering its scope. For example, selection of particular starting materials in preparing either the catalyst component or in the polymerization in which the catalyst component may be employed; intermediate products; catalyst components produced therefrom; reaction and process variables such as feed rate, processing temperatures, pressures and other conditions; and the like; not explicitly mentioned herein but falling within the general description hereof, will still fall within the intended scope of both the specification and claims appended hereto.

EXAMPLES

This example shows the effect of increasing levels of the precipitating agent on the size of the catalyst component particles and on their distribution.

A 1.0 L Buchi reactor was baked out at a temperature of slightly above about 100° C. for more than 12 hours while under a strong nitrogen purge. In a 250 mL pop bottle, 53.64 g of 20.6 weight percent butylethyl magnesium (0.11 Al weight percent) was collected and diluted to 200 mL total volume with hexane. This clear, colorless solution was transferred by cannula to a Buchi reactor. The pop bottle was then rinsed with 100 mL hexane that was added to the reaction. Agitation was started at 200 rpm.

In a 100 mL graduated cylinder, 26.90 g of neat 2-ethylhexanol was collected, then diluted to 50 mL total volume with hexane. This clear, colorless solution was cannula-transferred to the solution in the Buchi reactor over 23 minutes. The solution temperature increased from 24.1° C. to 34.5° C. The resulting solution was viscous, clear, and colorless. When the addition is complete, the graduated cylinder is rinsed into the reactor with about 35 mL of hexane and the contents, i.e., the magnesium alkoxide, was stirred for one hour.

In a 250 mL pop bottle, 77.50 g of 1.0M ClTi(OiPr)$_3$ as the halogenating/titanating agent was collected (about 100 mL volume). This slightly yellow, clear liquid was cannula-transferred to the Buchi. The addition time was 24 minutes, the starting temperature was 24.5° C., and the maximum temperature was 26.3° C. After 5 mL had been added, flaky particles formed that quickly redissolved. When about 50 mL had been added, the solution turned murky again. At addition's end, this solution was clear, colorless and somewhat viscous. After the addition, the pop bottle was rinsed with about 15 mL hexane into the Buchi. The reaction is allowed to stir for one hour.

In a 500 mL graduated cylinder, 239.9 g of a 30 weight percent 2TiCl$_4$/Ti(OBu)$_4$ mixture, as a precipitating agent, was collected (about 310 mL volume). This grayish-orange liquid was cannula-transferred to the reaction over 64 minutes. The initial temperature is 24.5° C. and the maximum temperature was 26.3° C. During the addition, samples may be collected at the addition points according to Table 1 below. Precipitating agent addition is stopped at each point during the sampling process.

TABLE 1

| Sample | Amount Precipitating Agent, mL |
|---|---|
| A | 10 |
| B | 17.5 |
| C | 27.5 |
| D | 57.5 |
| E | 82.5 |
| F | 107.5 |
| G | 207.5 |
| H | 307.5 |

Eight samples of the catalyst slurry in hexane were collected for Malvern particle size distribution analysis. Sample colors vary. Initial precipitate samples are white, but later samples are yellow.

When the addition is complete, the graduated cylinder is rinsed with 20 mL of hexane into the reactor and the solution is stirred for one hour. After this time, the catalyst slurry is allowed to settle. After 15 minutes, the supernatant is decanted and disposed of. The yellowish-white precipitate settles quickly and completely. About 200 mL of hexane is added to the solution. After stirring the contents for five minutes, agitation is discontinued and the catalyst slurry is allowed to settle. After 15 minutes, the supernatant is removed. An additional 200 mL of hexane is added and the contents stirred for five minutes. After one wash a slurry sample is collected. The remaining catalyst is killed with methanol.

Particle size and distribution data for samples taken at each concentration level (A-H) and for the final slurry sample (I), relative to the amount of precipitating agent, are shown in Table 2.

TABLE 2

| | Sample | | | | | | | | |
|---|---|---|---|---|---|---|---|---|---|
| | A | B | C | D | E | F | G | H | I |
| Volume (mL) | 10.0 | 17.5 | 27.5 | 57.5 | 82.5 | 107.5 | 207.5 | 307.5 | Final |
| Volume (%) | 3.2 | 5.6 | 8.9 | 18.5 | 26.6 | 34.7 | 66.9 | 99.2 | N/a |
| $D_{50}$* (microns) | 7.33 | 9.48 | 11.41 | 11.31 | 11.49 | 12.43 | 14.05 | 13.42 | 12.35 |
| $D_{10}$** (microns) | 4.61 | 4.56 | 5.40 | 5.48 | 5.16 | 4.72 | 6.64 | 6.72 | 5.47 |
| $D_{90}$*** (microns) | 11.53 | 19.78 | 21.07 | 20.61 | 21.76 | 24.97 | 25.17 | 23.09 | 22.39 |

*D50 is the average [?] diameter of at least [?] 50 percent of the sample.
**D10 is the average diameter of at least 10 percent of the sample.
***D90 is the average diameter of at least 90 percent of the sample.

It will be seen from the data in Table 2 and FIG. 1 that, as the concentration of the precipitating agent increases, the particle size average increases and the particle size distribution also increases.

What is claimed is:

1. A process for making a Ziegler-Natta catalyst having controlled particle size and distribution comprising altering the precipitation of a catalyst component from a catalyst synthesis solution including a soluble catalyst precursor and a precipitating agent comprising a titanium halide by controlling the concentration of:
   (1) the soluble catalyst precursor, wherein the average particle size of the catalyst component is increased, and the particle size distribution increased, with a decreased concentration of soluble catalyst precursor in the catalyst synthesis solution; and/or
   (2) the precipitating agent, wherein the average particle size of the catalyst component is increased, and the particle size distribution is increased, with an increased concentration of the precipitating agent in the catalyst synthesis solution.

2. The process of claim 1 wherein the altering of the precipitation of a catalyst component is done by controlling the concentration of (1) the soluble catalyst precursor.

3. The process of claim 1 wherein the altering of the precipitation of a catalyst component is done by controlling the concentration of (2) the precipitating agent.

4. The process of claim 1 wherein the altering of the precipitation of a catalyst component is done by controlling the concentration of both (1) the soluble catalyst precursor and (2) the precipitating agent.

5. The process of claim 1 wherein the concentration of the soluble catalyst precursor is decreased by increasing the concentration of a diluent.

6. The process of claim 5 wherein the starting concentration of the soluble catalyst precursor is maintained at a level of less than about 40 wt. percent.

7. The process of claim 6 wherein the starting concentration of the soluble catalyst precursor is maintained at a level of less than about 30 wt. percent.

8. The process of claim 6 wherein the starting concentration of the soluble catalyst precursor is maintained at a level of less than about 20 wt. percent.

9. The process of claim 6 wherein the starting concentration of the soluble catalyst precursor is maintained at a level of less than about 15 wt. percent.

10. The process of claim 6 wherein the starting concentration of the soluble catalyst precursor is maintained at a level of less than about 5 wt. percent.

11. A process for making a Ziegler-Natta catalyst having controlled particle size and distribution comprising altering the precipitation of a catalyst component from a catalyst synthesis solution including a soluble catalyst precursor and a precipitating agent by controlling the concentration of:
   (1) the soluble catalyst precursor, wherein the average particle size of the catalyst component is increased, and the particle size distribution increased, with a decreased concentration of soluble catalyst precursor in the catalyst synthesis solution; and/or
   (2) the precipitating agent, wherein the average particle size of the catalyst component is increased, and the particle size distribution is increased, with an increased concentration of the precipitating agent in the catalyst synthesis solution, wherein the catalyst component is prepared by reacting butylethyl magnesium and 2-ethylhexanol to form a magnesium dialkoxide, the magnesium dialkoxide is then reacted with $ClTi(O^iPr)_3$ to from a soluble catalyst precursor, and the soluble catalyst precursor is then reacted with a $Ti(OBu)Cl_3/Ti(OBu)_2Cl_2$ mixture to form a solid catalyst component and wherein the catalyst synthesis occurs at room temperature.

12. The process of claim 1 wherein the starting concentration of the soluble catalyst component is less than about 15 wt % prior to addition of the precipitating agent; or the concentration of the precipitating agent is greater than about 12 wt %.

13. The process of claim 1 wherein the starting concentration of the soluble catalyst component is less than about 15 wt % prior to addition of the precipitating agent; and the concentration of the precipitating agent is greater than about 12 wt %.

* * * * *